United States Patent Office 3,824,153
Patented July 16, 1974

---

3,824,153
NUCLEAR REACTOR FUEL ASSEMBLY SPACER GRID
Bernard Leaver, Atherton, and Thomas Seddon, St. Annes, England, assignors to United Kingdom Atomic Energy Authority, London, England
Filed June 26, 1972, Ser. No. 266,042
Claims priority, application Great Britain, July 7, 1971, 32,004/71
Int. Cl. G21c 3/34
U.S. Cl. 176—78
2 Claims

ABSTRACT OF THE DISCLOSURE

A spacer grid in a fuel element assembly including a plurality of elongate fuel pins supported in a bundle with their longitudinal axes parallel comprises a rigid grid structure of intersecting cross members defining cells each of which is penetrated by a fuel pin of the assembly and resilient strip members slotted through the grid structure parallel to the cross members, the resilient strip members providing transverse support for the fuel pins in the cells of the grid structure and stop means being formed projecting from the cross members inside the cells and underlying the strip members in the cells.

BACKGROUND OF THE INVENTION

This invention relates to nuclear reactor fuel element assemblies and in particular to that kind of fuel element assembly including a plurality of elongate fuel pins supported in a bundle with their longitudinal axes parallel. Such a fuel element assembly employs one or more spacer grids disposed at positions intermediate between the ends of the assembly and serving to retain the correct lateral location of the fuel pins in the assembly relative to one another. Such grids typically comprise a group of cells each for penetration by a fuel pin and are usually fabricated from thin strip material or thin walled tubes such as stainless steel in an attempt to minimise restriction to reactor coolant flow which is axially through the bundle between the fuel pins. Location of the fuel pins may be by rigid projections formed inside the cells of the spacer grid. The projections may be an interference fit or a close clearance fit with the fuel pins and the grids must be made with a high degree of precision to ensure accurate geometrical spacing of the fuel pins, a feature which makes such grids expensive to fabricate. Also, although the tolerances allowed on manufacture of such spacer grids and on the diameter of the fuel pins are kept to a minimum, slight inaccuracies in manufacture may give rise to large clearances arising between some of the projections and the fuel pins, allowing lateral vibration of these fuel pins which gives rise to "fretting" of the elements. "Fretting" is surface damage of the fuel pins due to tapping of the fuel pins against the locating projections in the cells of the spacer grids. This disadvantage has been largely overcome in the type of spacer grid in which the fuel pins are a clearance fit in the cells of the grid and by the attachment of wearing pads to the fuel pins at points of tapping of the fuel pins in the cells of the grids. However the attachment of such wearing pads to the fuel pins introduces further problems and adds to the expense of fabrication of the fuel element assembly.

Yet another form of spacer grid provides for resilient bracing of the fuel pins, for example by spring locating members projecting inside the cells of the grid. The spring locating members may hold the fuel pins against opposed rigid projections inside the cells of the grid. Again such a grid calls for a high accuracy of manufacture and "fretting" can still occur in this arrangement between the fuel pins and the rigid locating projections.

It is an object of the present invention to provide a simple form of spacer grid which does not call for a high degree of accuracy in manufacture and which will render some of the disadvantages of previous forms of spacer grids less significant.

SUMMARY OF THE INVENTION

According to the present invention a spacer grid for a nuclear reactor fuel element assembly of the hereinbefore specified kind comprises a rigid grid structure of intersecting cross members, the cross members defining cells each of which is penetrated by a fuel pin of the fuel element assembly, resilient strip members being slotted through the grid structure parallel to the cross members of the grid structure, the resilient strip members providing tansverse support for the fuel pins in the cells of the grid structure, and stop-means being formed projecting from the cross members of the grid structure inside the cells and underlying the strip members in the cells. It is arranged that a small clearance exists between the stop-means and the back faces of the corresponding resilient strips in the cells of the grid structure. The flexibility of the resilient strip members allows for lateral vibration of the fuel pins in the spacer grid within the limits defined by the clearance between the stop means and the resilient strip members. The stop means absorb fuel pin vibration by tapping of the back faces of the resilient strip members against the stop means. Fretting in the spacer grid is limited to the points of contact of the resilient strip members and the stop means and fretting between the points of contact of the resilient strip members with the fuel pins is minimised.

DESCRIPTION OF THE DRAWINGS

An embodiment of the invention will now be described by way of example with reference to the accompanying drawings in which.

DESCRIPTION OF THE PREFERRED EMBODIMENT

Figure 1:
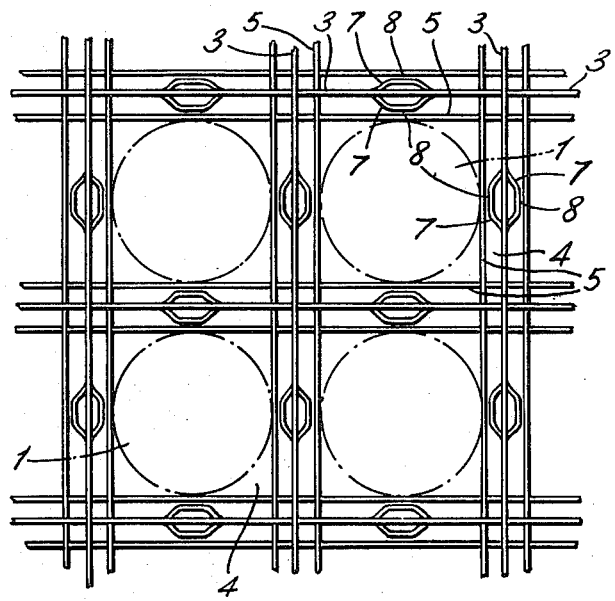
FIG. 1 is a plan view of part of a nuclear reactor fuel element assembly incorporating a spacer grid in accordance with the invention.
Figure 2:
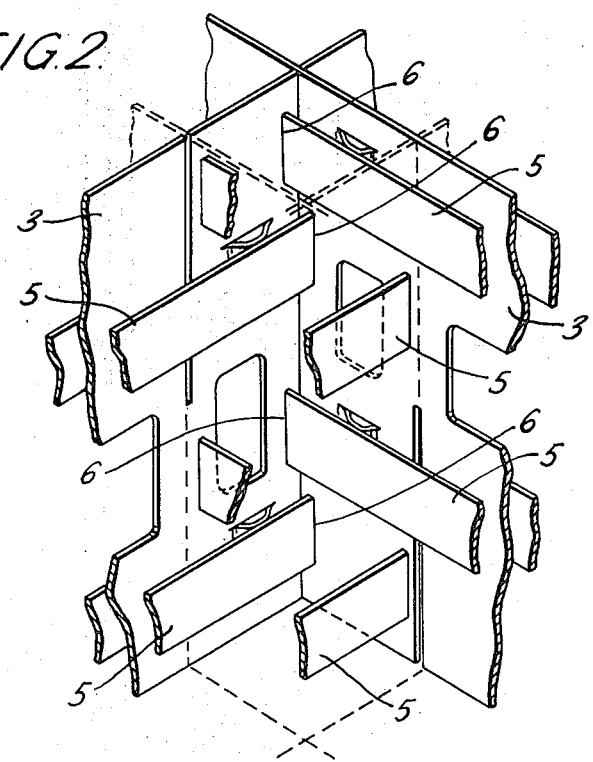
FIG. 2 is an isometric detail of the spacer grid shown in FIG. 1.

The drawings show part of a nuclear reactor fuel element assembly comprising a plurality of cylindrical fuel pins 1 arranged with their longitudinal axes parallel. The fuel pins 1 are spaced apart and located at points intermediate their ends by transverse spacer grids one of which is shown in FIGS. 1 and 2. Each spacer grid comprises a grid structure 2 in the form of a single deep tier of cross members 3 within an outer band (not shown). The cross members 3 are transversely slotted to fit together in "egg-box" fashion forming a rigid structure defining cells 4 which are penetrated by the fuel pins 1. The grid structure 2 is fabricated from a material compatible with the operating conditions in the reactor and preferably having a low neutron absorption cross section, for example Zircaloy, enabling neutron economy to be obtained. All points of intersection of the cross members 3 in the grid structure 2 are brazed or welded. Slotted into the grid structure 2 at four levels are resilient strip members 5 which are fabricated from a springy material such as stainless steel, Inconel or nimonic alloy. The strip members 5 extend parallel to and on either side of the cross members 3 in the grid structure 2. The cross members 3 have transverse slots 6 for passage of the strip members 5 the slots 6 being positioned so that the strip members 5 are spaced by a small distance from the faces of the cross members 3 in the cells 4 of the grid structure 2. The fuel pins 1 are an interference fit with the inner faces of the strip members 5 in the cells 4.

Dimple shaped stops 7 are formed projecting from the faces of the cross members 3 in the cells 4 of the grid structure 2. Each of the stops 7 underlies one of the strip members 5 in the cells 4. A small clearance 8 exists between each stop 7 and the back face of the corresponding strip member 5.

The fuel pins 1 are resiliently supported by the strip members 5. The degree of resilience of the support given to the fuel pins 1 can be modified either by altering the interference fit of the fuel pins 1 with the strip members 5 or by altering the section of the strip members 5.

The freedom of lateral vibration of the fuel pins 1 as allowed by the flexibility of the strip members 5 is limited by the stops 7, the extent of vibration being limited by contact of the back faces of the strip members 5 with the stops 7. Hence the stops 7 also limit the minimum pin to pin clearance in the fuel element assembly. Any fretting in the fuel element assembly is taken at the points of tapping of the back faces of the strip members 5 with the stops 7 and hence fretting between the fuel pins 1 and the strip members 5 at their points of contact is minimised.

In a fuel element assembly a number of the spacer grids 2 are provided at spaced intervals along the length of the assembly. The spacer grids 2 may be attached to one of the fuel pins 1 or alternatively, one of the fuel pins 1 may be replaced by an unfuelled support tube to which the spacer grids 2 are attached.

We claim:

1. A fuel assembly comprising a spacer grid holding nuclear fuel rods in spaced apart relationship with their axes parallel, the grid comprising a number of flat rigid strip members arranged to intersect one another in planes at right angles to form a plurality of flat sided cells each receiving a nuclear fuel rod, a plurality of protuberant stop means on each rigid strip member making up said cells such that each flat side of said cells has at least one of said stop means protruding inwardly toward said fuel rod, each of said rigid strip members forming a flat side of said cell having at least one flat resilient strip extending parallel to said rigid strip member and spaced between said protuberant stop means and said fuel rod, each resilient strip being fastened at each end to an adjacent transverse rigid strip member, the resilient strips in each cell being spaced to position the nuclear fuel rod in the grid as an interference fit whereby, upon deflection of the fuel rods and grid in a direction transverse to the longitudinal axes of the fuel rods each fuel rod and its contacting resilient strips within a cell moves as a unit maintaining its interference fit, said deflections being limited by engagement of the protuberant stop means with the resilient strips.

2. A fuel assembly as claimed in claim 1 in which the resilient strips are contained between upper and lower planes containing the grid and are arranged as parallel pairs, each pair being situated at a difference level in the grid.

References Cited

UNITED STATES PATENTS

| | | | |
|---|---|---|---|
| 3,380,890 | 4/1968 | Glandin et al. | 176—78 |
| 3,442,763 | 5/1969 | Chetter et al. | 176—78 |

FOREIGN PATENTS

| | | | |
|---|---|---|---|
| 1,514,559 | 6/1969 | Germany | 176—78 |
| 1,036,852 | 7/1966 | Great Britain | 176—78 |

BENJAMIN R. PADGETT, Primary Examiner

R. S. GAITHER, Assistant Examiner

U.S. Cl. X.R.

178—76